(12) United States Patent
Kim et al.

(10) Patent No.: US 9,249,945 B2
(45) Date of Patent: Feb. 2, 2016

(54) LAMP MODULE FOR VEHICLE

(71) Applicant: HYUNDAI MOBIS CO., LTD., Seoul (KR)

(72) Inventors: Jin A Kim, Yongin (KR); Seung Woo Baek, Yongin (KR); Ban Suk Choi, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/334,632

(22) Filed: Jul. 17, 2014

(65) Prior Publication Data

US 2015/0345730 A1 Dec. 3, 2015

(30) Foreign Application Priority Data

Jun. 2, 2014 (KR) ........................ 10-2014-0066632

(51) Int. Cl.
*F21S 8/10* (2006.01)
*B60Q 1/24* (2006.01)
*B60Q 1/30* (2006.01)
*B60Q 1/00* (2006.01)

(52) U.S. Cl.
CPC . *F21S 48/24* (2013.01); *B60Q 1/24* (2013.01); *F21S 48/215* (2013.01); *F21S 48/234* (2013.01); *B60Q 1/0011* (2013.01); *B60Q 1/30* (2013.01)

(58) Field of Classification Search
CPC .......... B60Q 1/0011; B60Q 1/24; B60Q 1/30; F21S 48/24
See application file for complete search history.

(56) References Cited

U.S. PATENT DOCUMENTS

| 3,969,621 | A | * | 7/1976 | Ferrell | 362/299 |
| 6,380,964 | B1 | * | 4/2002 | Tanaka | 347/217 |
| 2003/0169598 | A1 | * | 9/2003 | Imazeki et al. | 362/517 |
| 2004/0008516 | A1 | * | 1/2004 | Amano | 362/300 |
| 2005/0146887 | A1 | * | 7/2005 | Calderas | 362/509 |
| 2010/0149803 | A1 | * | 6/2010 | Nakano et al. | 362/235 |

FOREIGN PATENT DOCUMENTS

| JP | 2010-277818 A | 12/2010 |
| KR | 10-1342059 B1 | 12/2013 |

* cited by examiner

*Primary Examiner* — Anabel Ton (57) ABSTRACT

Disclosed is a lamp for a vehicle, which includes: an inner lens; a light source unit configured to irradiate light toward the inner lens; and a mirror reflector configured to extend an image of the inner lens by reflecting one area of the inner lens. As a result, a large-area image of the inner lens is able to be implemented.

17 Claims, 6 Drawing Sheets

LAMP MODULE FOR VEHICLE

CROSS-REFERENCE TO RELATED APPLICATIONS

This application claims priority to and the benefit of Korean Patent Application No. 10-2014-0066632 filed in the Korean Intellectual Property Office on Jun. 2, 2014, the entire contents of which are incorporated herein by reference.

TECHNICAL FIELD

The present invention relates to a lamp module for a vehicle. More particularly, the present invention relates to a lamp module for a vehicle that extends an image of a lens with a mirror reflector, thereby increasing a degree in freedom of a design.

BACKGROUND ART

In general, a vehicle includes various types of vehicular lamps having an illumination function for easily verifying an object positioned around the vehicle when the vehicle is driven at night and a signal function for notifying a driving state of the vehicle to other vehicles or road users.

For example, a head lamp and a fog lamp primarily aim at the illumination function and a turn signal lamp, a tail lamp, a brake lamp, a side marker, and the like primarily aim at the signal function. Installation criteria and specifications of the vehicular lamps are regulated by the law so that the vehicular lamps sufficiently show the functions.

Meanwhile, in recent years, since the vehicular lamps are key components in an exterior of the vehicle in addition to the illumination function or the signal function, such that an overall exterior of the vehicle has been determined according to the shape of the vehicular lamp at night, a demand for the vehicular lamps associated with various exterior designs has been increased.

Among them, a rear combination lamp is limited in a design for improving exterior quality.

Figure 1:
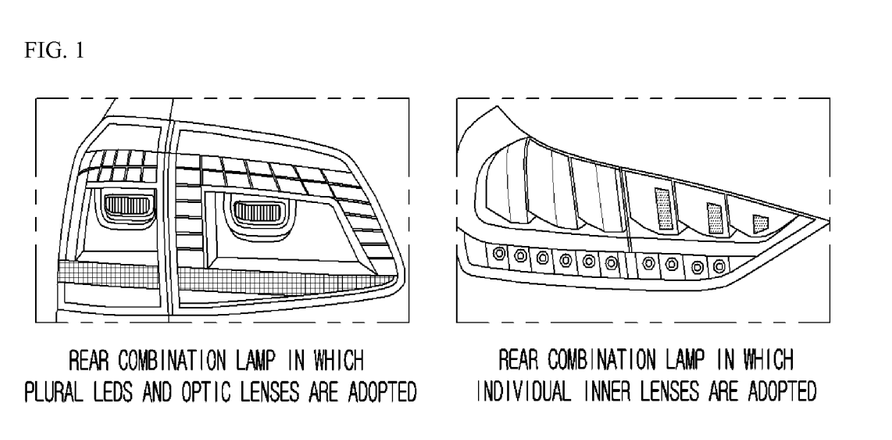
FIG. 1 is a diagram illustrating a rear combination lamp in the related art.
Figure 2:
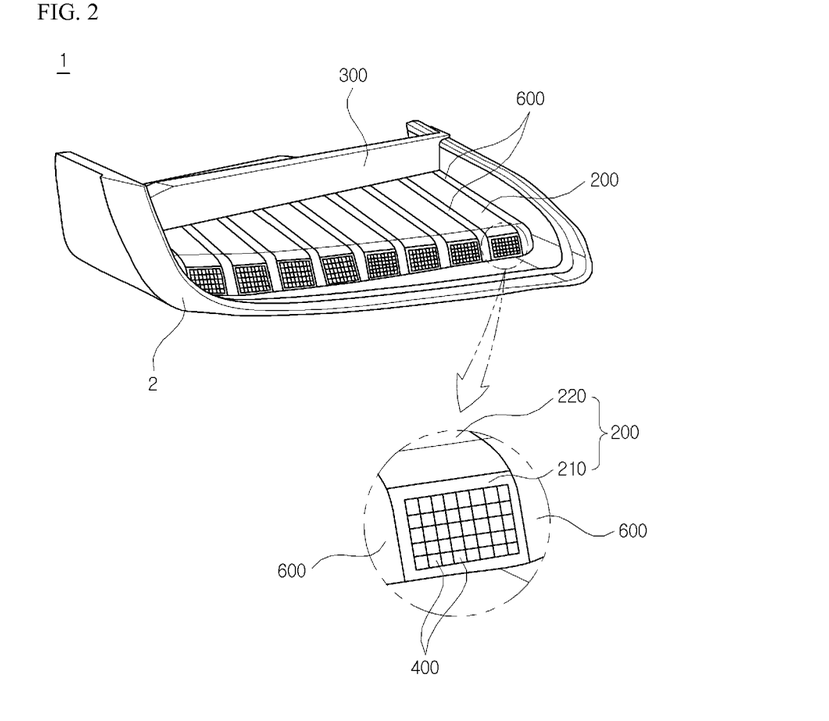
FIGS. 2 and 3 are a perspective view and a front view illustrating a lamp module for a vehicle according to an exemplary embodiment of the present invention.
Figure 3:
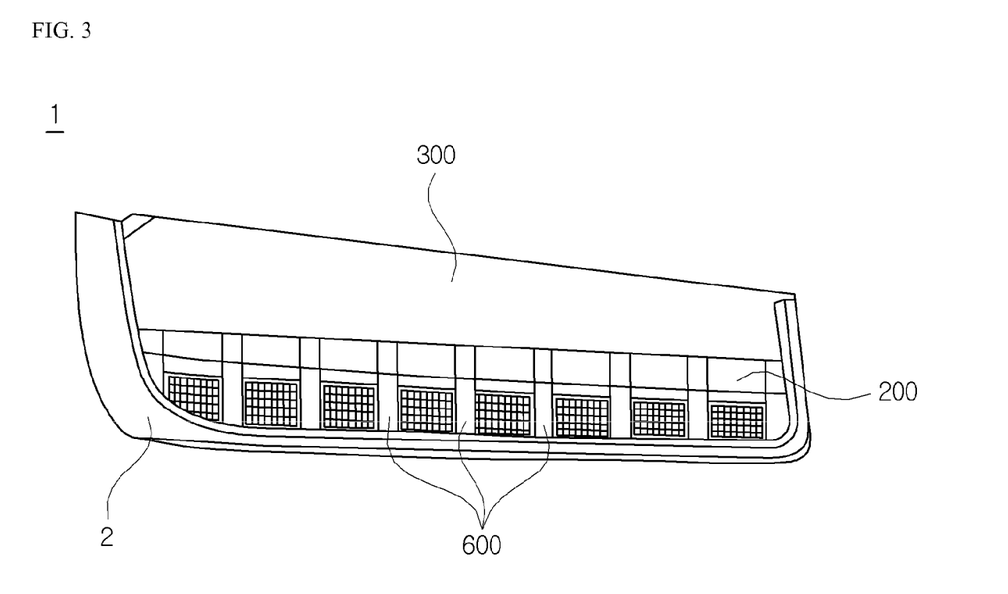

Accordingly, as illustrated in FIG. 1, the rear combination lamp adopts various designs and structures including a type in which a plurality of LEDs and optic lenses are adopted, a type in which individual inner lens modules are adopted, a type in which a bent area is extended, or the like.

However, the type in which the plurality of LEDs and optic lenses are adopted is limited in implementing a 3D-effect design due to an increase in manufacturing cost. The type in which the individual inner lens modules are adopted use the individual inner lens modules and consequently, the type increases cost.

As the related art associated with the rear combination lamp, there is Korean Patent No. 10-1342059 (Dec. 10, 2013) entitled 'Rear Lamp for Vehicle'.

The rear lamp for the vehicle serves to perform two or more lamp functions. The rear lamp for the vehicle is characterized in improving the exterior design by using an optic unit installed in the rear lamp for the vehicle.

However, the rear lamp for the vehicle just attempts to improve the exterior design by using the optic unit, but uses a lens bent to the front of the vehicle, and as a result, the rear lamp for the vehicle is limited in implementing visibility and various lamp shapes according to view positions of a driver of a rear vehicle.

SUMMARY OF THE INVENTION

The present invention has been made in an effort to provide a lamp module for a vehicle, which implements a large-area lighting image of an inner lens by using a mirror reflector.

The present invention has also been made in an effort to provide a lamp module for a vehicle in which the mirror reflector is provided with a predetermined curvature to implement various and 3D-effect images of the inner lens.

An exemplary embodiment of the present invention provides a lamp module for a vehicle, including: an inner lens; a light source unit configured to irradiate light toward the inner lens; and a mirror reflector configured to extend an image of the inner lens by reflecting one area of the inner lens.

The mirror reflector may be formed to be bent with a predetermined curvature.

The curvature may increase or decrease toward the other side from one side of the mirror reflector.

The height of the mirror reflector may increase or decrease toward the other side from one side of the mirror reflector.

One side of the mirror reflector may be installed along one side of the inner lens.

The light source unit may include a light source, and a reflector configured to reflect the light irradiated from the light source toward the inner lens.

The inner lens may include a brake lens unit, and a tail lens unit formed to be inclined at a predetermined inclination angle toward the mirror reflector from one end of the brake lens unit.

The lamp module for a vehicle may further include a brake light source unit configured to irradiate light to the brake lens unit.

An optic lens may be installed in the brake lens unit or the tail lens unit.

A bezel may be installed on the outer circumference of the inner lens.

The inner lens may be colored.

The inner lens may be bent to have a predetermined inclination angle.

According to exemplary embodiments of the present invention, a lamp module for a vehicle can implement a large-area image of an inner lens by using a mirror reflector.

A height or a curvature of the mirror reflector is increased or decreased toward the other side from one side to implement a 3D-effect and space-sensible large-area image of the inner lens.

As a result, a degree of freedom of a vehicular lamp can be improved.

The lamp module for a vehicle implements the large-area image of the inner lens by using a small number of light sources to save manufacturing cost.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the exemplary embodiments of the present invention will be described in detail with reference to the accompanying drawings in order to clarify a method of solving the technical problems of the present invention. However, when a description of the related art still obscures the spirit of the present invention in describing the present invention, a description thereof will be omitted. The terms used in the following description are defined considering the functions of the present invention and may vary depending on the intention or usual practice of a designer or manufacturer. Therefore, the definitions should be made based on the entire contents of the present specification. Parts indicated by like reference numerals refer to like elements throughout the specification.

Hereinafter, a lamp module for a vehicle according to an exemplary embodiment of the present invention will be described.

Referring to FIGS. 2 to 9, a lamp module 1 for a vehicle according to the exemplary embodiment of the present invention may include a housing 2, an outer lens 3, a light source unit 100, an inner lens 200, and a mirror reflector 300.

The outer lens 3, the light source unit 100, the inner lens 200, and the mirror reflector 300 may be installed in the housing 2.

The light source unit 100 irradiates light toward the inner lens 200. The light source unit 100 may include a light source 110 and a reflector 120. Herein, a light emitting diode (LED) may be used as the light source 110.

The reflector 120 reflects light irradiated from the light source 110 to make light be irradiated toward the inner lens 200.

The light source unit 100 of the lamp module 1 for a vehicle uses the reflector 120 as an example thereof, but is not particularly limited thereto and may directly irradiate light toward the inner lens 200 from the light source 110 without using the reflector 120, of course.

The inner lens 200 may be installed on an irradiation line of the light irradiated from the light source unit 100. The inner lens 200 may be colored with colors including a red, and the like in order to increase visibility for a passenger of a rear vehicle or a pedestrian.

The inner lens 200 may include a brake lens unit 210 and a tail lens unit 220.

Figure 4:
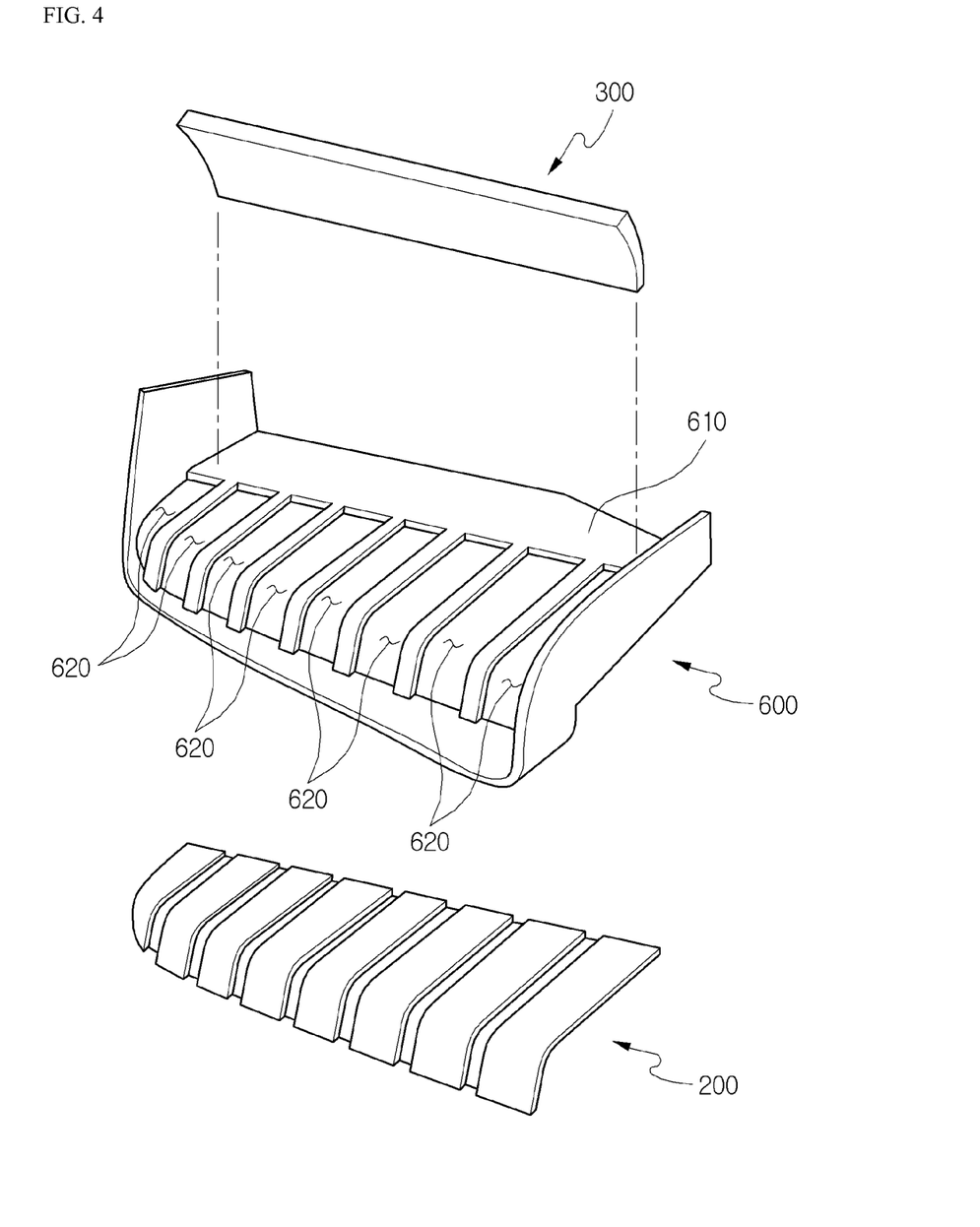
FIG. 4 is a diagram illustrating a combination relationship of an inner lens, a mirror reflector, and a bezel of the lamp module for a vehicle according to the exemplary embodiment of the present invention.
Figure 5:
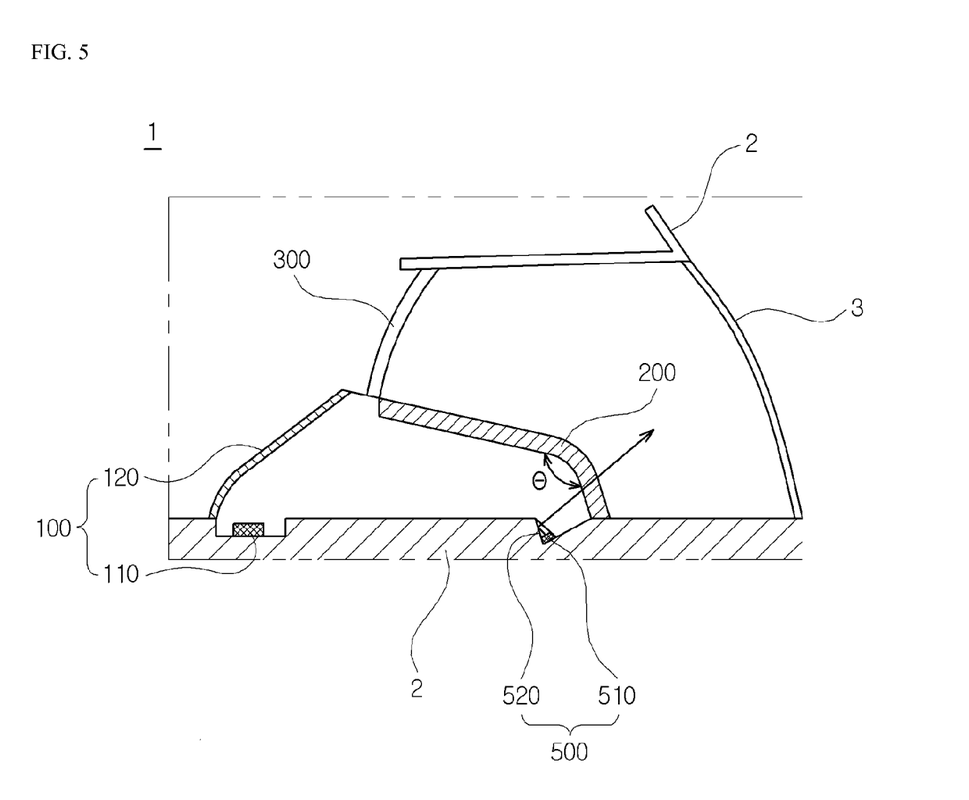
FIG. 5 is a conceptual diagram illustrating the lamp module for a vehicle according to the exemplary embodiment of the present invention.

The brake lens unit 210 and the tail lens unit 220 may be divided as one area of the inner lens 200 is bent, as illustrated in FIGS. 4 and 5.

As one area of the inner lens 200 is bent, the brake lens unit 210 and the tail lens unit 220 form a predetermined inclination angle θ as illustrated in FIG. 5.

The inclination angle may be provided at an angle, which is equal to or higher than 90 degrees or less than 180 degrees, by considering visibility for the passenger of the rear vehicle and an image of the inner lens 200 reflected on the mirror reflector 300.

Meanwhile, an optic lens 400 having a predetermined shape may be installed in the brake lens unit 210 or the tail lens unit 220. As a result, the optic lens 400 scatters or refracts the light irradiated from the light source unit 100 to implement various and high-visibility lighting images of the inner lens 200.

For example, when the optic lens 400 is installed in only any one of the brake lens unit 210 and the tail lens unit 220, the lighting image of any one of the brake lens unit 210 and the tail lens unit 220 is differentiated from the lighting image of the other one of the brake lens unit 210 and the tail lens unit 220 to improve the visibility for the passenger of the rear vehicle.

The optic lens 400 serves to make an exterior design of the inner lens 200 be beautiful according to a shape thereof. When the optic lens 400 scatters light, the optic lens 400 scatters the light irradiated from the light source unit 100, and as a result, the light may make a softer feel.

Meanwhile, the lamp module 1 for a vehicle may further include a brake light source unit 500.

Figure 6:
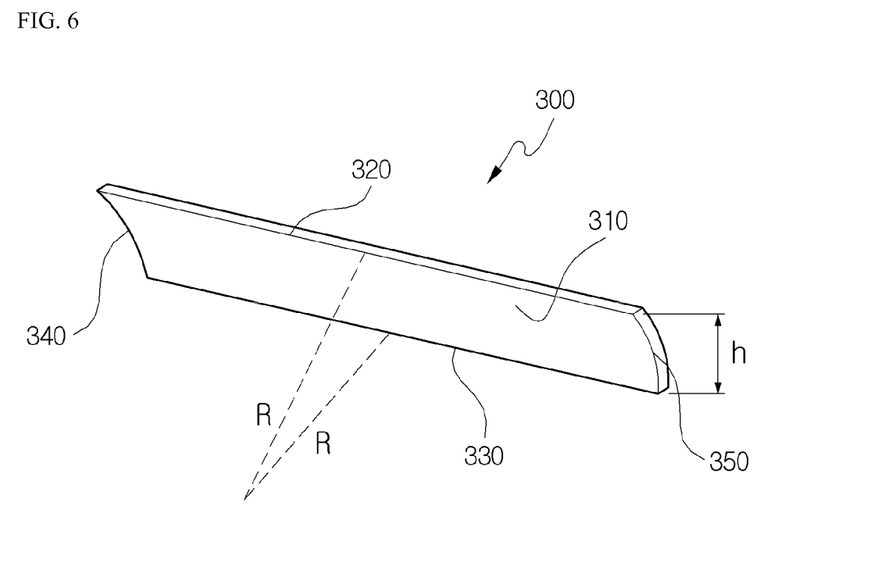
FIGS. 6 and 7 are diagrams illustrating an embodiment of the mirror reflector of the lamp module for a vehicle according to the exemplary embodiment of the present invention.
Figure 7:
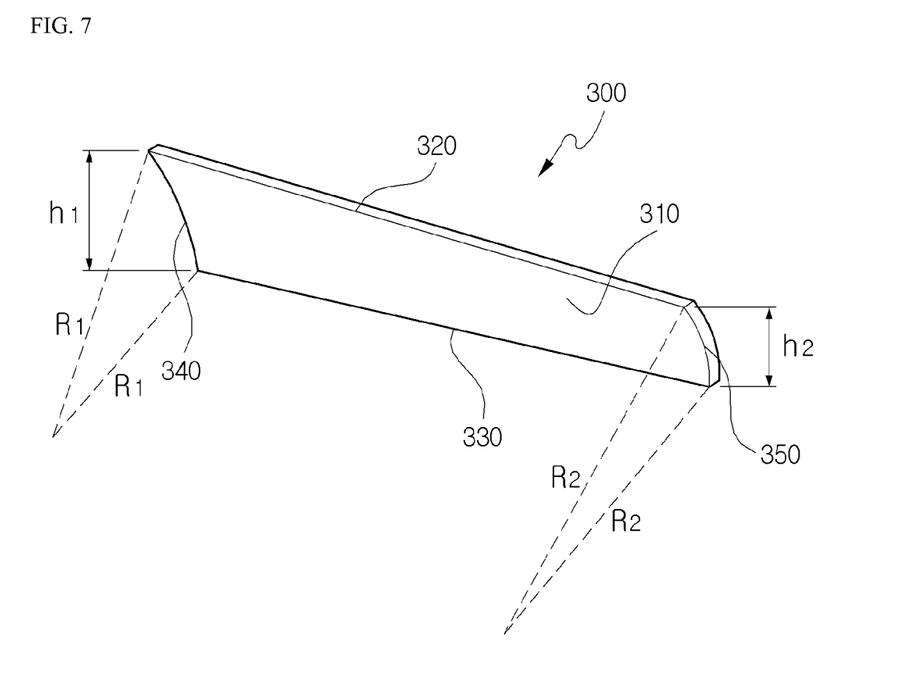

Referring to FIGS. 5 to 7, the brake light source unit 500 irradiates light toward the brake lens unit 210 to effectively notify the passenger of the rear vehicle that a vehicle is in a brake state when the vehicle is braked.

Herein, the brake light source unit 500 may include a brake light source 510 and a brake reflector 520 that allows light irradiated from the brake light source 510 to be irradiated toward the brake lens unit 210.

The lamp module 1 for a vehicle may further include a bezel 600.

The bezel 600 may be installed on the outer circumference of the inner lens 200 based on a light irradiation direction of the light source unit 100. Accordingly, the bezel 600 blocks some of light irradiated through the inner lens 200 and passes some of the light to implement various patterns.

As illustrated in FIG. 4, the bezel 600 may include a frame 610 and an opening 620 formed at one side of the frame 610.

Figure 9:
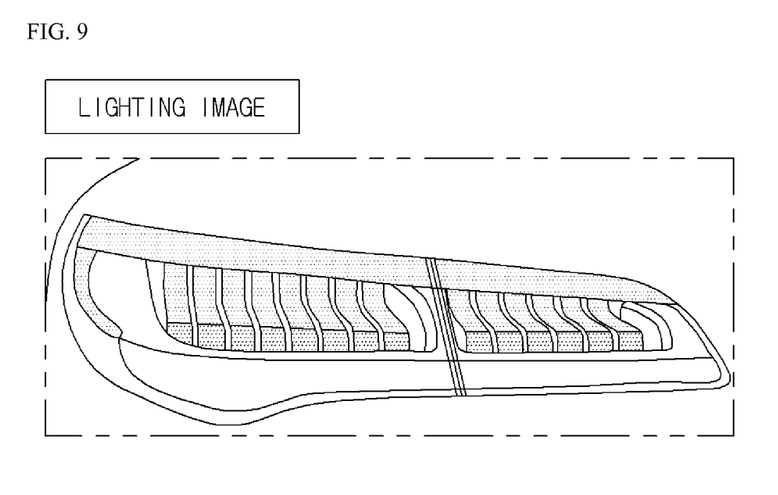
FIG. 9 is a diagram illustrating lighting of the lamp module for a vehicle according to the exemplary embodiment of the present invention.

As illustrated in FIG. 9, the bezel 600 makes various patterns including a linear 3D pattern be implemented. For example, the inner lens 200 shows an effect as if a plurality of individual inner lenses uses the bezel 600 for reflection.

That is, the lamp module 1 for a vehicle further includes the bezel 600 in addition to the optic lens 400 to variously change a design of the inner lens 200.

The mirror reflector 300 reflects one area of the inner lens 200 to extend an image of the inner lens 200. Accordingly, the passenger of the rear vehicle recognizes the image of the inner lens 200 reflected by the mirror reflector 300 in addition to the lighted inner lens 200. Therefore, the mirror reflector 300 extends the image of the inner lens 200.

Figure 8:
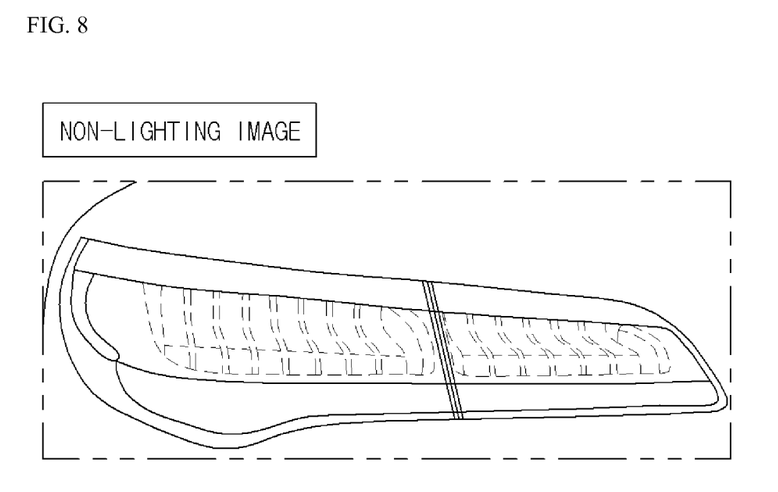
FIG. 8 is a diagram illustrating non-lighting of the lamp module for a vehicle according to the exemplary embodiment of the present invention.

That is, the mirror reflector 300 may implement the large-area image of the inner lens 200 by extending a non-lighting image or a lighting image of the inner lens 200 as illustrated in FIGS. 8 and 9.

Meanwhile, the mirror reflector 300 may be formed to be inclined based on an axial direction of the vehicle or bent with a predetermined curvature so as to reflect one area of the inner lens 200.

Referring to FIGS. 4 to 7, the mirror reflector 300 may include a reflection surface 310, an upper side 320, a lower side 330, a first lateral side 340, and a second lateral side 350.

The reflection surface 310 reflects the inner lens 200 or one area of the inner lens 200 where the bezel 600 is installed, thereby extending the image of the inner lens 200.

Herein, the reflection surface 310 may be formed to be bent with a predetermined curvature radius R as illustrated in FIG. 6. That is, the reflection surface 310 may be formed to be bent at a predetermined curvature.

As a result, the bent mirror reflector 300 implements a 3D-effect and space-sensible image of the inner lens 300.

The curvature of the reflection surface 310 may increase or decrease toward the other side from one side of the mirror reflector 300.

For example, as illustrated in FIG. 7, the first lateral side 340 may be formed to be bent with a predetermined curvature radius $R_1$ and the second lateral side 350 may be formed to be bent with a predetermined curvature radius $R_2$.

That is, respective curvatures of the first and second lateral sides 340 and 350 of the mirror reflector 300 may be asymmetric to each other based on a vertical axis passing through the center of the mirror reflector 300. Therefore, the mirror reflector 300 may change the image of the inner lens 300 to a 3D-effect and space sensible image.

The height of the reflection reflector 300 may increase or decrease toward the other side from one side of the mirror reflector 300. That is, respective heights of the first and second lateral sides 340 and 350 of the mirror reflector 300 may be different from each other based on the vertical axis passing through the center of the mirror reflector 300.

For example, as illustrated in FIG. 7, the height of the mirror reflector 300 decreases toward the second lateral side 350 from the first lateral side 340.

Accordingly, by controlling a dimension of the image of the inner lens 200 reflected by the mirror reflector 300, the image of the inner lens 300 may be changed to be 3D-effective and space-sensible.

As described above, the curvature or height is consecutively changed from the first lateral side 340 to the second lateral side 350 of the mirror reflector 300 as an example, but the present invention is not particularly limited thereto and the curvature or height of the mirror reflector 300 may be consecutively changed only in one area, of course.

Meanwhile, the mirror reflector 300 may be installed along one side of the inner lens 200 as illustrated in FIG. 5. That is, the lower side 330 of the mirror reflector 300 may be installed on one edge of the tail lens unit 220.

Accordingly, the image of the inner lens 300 may be implemented in a consecutive linear 3D pattern by the mirror reflector 300 as illustrated in FIGS. 6 and 7.

Meanwhile, as illustrated in FIG. 5, the outer lens 3 is disposed on an irradiation line of the light irradiated from the light source unit 100, but may be installed outside the inner lens 200, as illustrated in FIG. 5.

As an example, the lamp module 1 for a vehicle is used for a tail lamp capable of making a pedestrian or a vehicle, which travels in the rear, recognizable in the presence of the vehicle or recognizable when the vehicle is in a brake state, during night driving or tunnel driving, as illustrated in FIGS. 8 and 9. However, the present invention is not particularly limited thereto and the lamp module 1 for a vehicle may be used for various vehicular lamps including a head lamp, a signal lamp, and the like, of course.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A lamp module for a vehicle, comprising:
   an inner lens divided into a first area and a second area by a bend in the inner lens;
   a first light source with a first illumination pattern oriented toward the first area of the inner lens;
   a second light source with a second illumination pattern oriented toward the second area of the inner lens; and
   a mirror reflector oriented to extend an image of the inner lens by reflecting light irradiated from one of the first area and the second area of the inner lens.

2. The lamp module of claim 1, wherein the mirror reflector is bent at a predetermined curvature.

3. The lamp module of claim 2, wherein the curvature increases or decreases from a first side to a second side of the mirror reflector.

4. The lamp module of claim 1, wherein the height of the mirror reflector increases or decreases toward the other side from one side of the mirror reflector.

5. The lamp module of claim 1, wherein one side of the mirror reflector is installed along one side of the inner lens.

6. The lamp module of claim 1, further comprising:
   a first reflector oriented to reflect the first illumination pattern from the first light source toward the inner lens.

7. The lamp module of claim 1, wherein the first area is a brake lens unit; and
   wherein the second area is a tail lens unit that is inclined at a predetermined inclination angle toward the mirror reflector from one end of the brake lens unit.

8. The lamp module of claim 7, wherein the first light source is a brake light source unit with the second illumination pattern oriented toward the brake lens unit.

9. The lamp module of claim 7, wherein an optic lens is installed in one of the brake lens unit or the tail lens unit.

10. The lamp module of claim 1, wherein a bezel is installed on the outer circumference of the inner lens.

11. The lamp module of claim 1, wherein the inner lens is colored.

12. The lamp module of claim 1, wherein the bend of the inner lens has a predetermined inclination angle.

13. The lamp module of claim 2, wherein a height of the mirror reflector increases or decreases from a first side to a second side of the mirror reflector.

14. The lamp module of claim 3, wherein a height of the mirror reflector increases or decreases from the first side to the second side of the mirror reflector.

15. The lamp module of claim 1, further comprising an optic lens located in a path of light irradiated from the first light source to the first part of the inner lens.

16. The lamp module of claim 1, wherein the first and second parts of the inner lens are substantially flat.

17. The lamp module of claim 6, further comprising:
a second reflector oriented to reflect the second light illumination pattern toward the inner lens.

\* \* \* \* \*